United States Patent
Utsunomiya

(10) Patent No.: US 8,304,706 B2
(45) Date of Patent: Nov. 6, 2012

(54) PHOTODETECTOR CIRCUIT AND ELECTRONIC DEVICE

(75) Inventor: Fumiyasu Utsunomiya, Chiba (JP)

(73) Assignee: Seiko Instruments Inc., Chiba (JP)

( * ) Notice: Subject to any disclaimer, the term of this patent is extended or adjusted under 35 U.S.C. 154(b) by 415 days.

(21) Appl. No.: 12/756,441

(22) Filed: Apr. 8, 2010

(65) Prior Publication Data

US 2010/0258706 A1    Oct. 14, 2010

(30) Foreign Application Priority Data

Apr. 13, 2009 (JP) ................... 2009-097301
Jun. 26, 2009 (JP) ................... 2009-152975

(51) Int. Cl.
*G01J 1/42* (2006.01)
*H01L 31/09* (2006.01)

(52) U.S. Cl. ............... 250/206; 327/514; 250/208.1

(58) Field of Classification Search ............... 250/208.1, 250/206; 327/514
See application file for complete search history.

(56) References Cited

FOREIGN PATENT DOCUMENTS
JP    2006-287658 A    10/2006

*Primary Examiner* — Tony Ko
(74) *Attorney, Agent, or Firm* — Brinks Hofer Gilson & Lione

(57) ABSTRACT

Provided is a photodetector circuit having significantly low current consumption. The photodetector circuit includes two opposing P-channel metal oxide semiconductor (MOS) transistors each including a gate connected to a drain of the opposing P-channel MOS transistor. The drain of one of the P-channel MOS transistors is discharged with an ON-state current of an N-channel MOS transistor which is turned ON with a voltage generated in a photoelectric element. The drain of the other of the P-channel MOS transistors is discharged with an ON-state current of a depletion type N-channel MOS transistor including a gate to which a voltage of a reference power supply terminal is input, and a source to which the voltage generated in the photoelectric element is input.

7 Claims, 3 Drawing Sheets

PHOTODETECTOR CIRCUIT AND ELECTRONIC DEVICE

RELATED APPLICATIONS

This application claims priority under 35 U.S.C. §119 to Japanese Patent Application Nos. 2009-097301 filed on Apr. 13, 2009 and 2009-152975 filed on Jun. 26, 2009, the entire contents of which are hereby incorporated by reference.

BACKGROUND OF THE INVENTION

1. Field of the Invention

The present invention relates to a photodetector circuit for detecting light, such as visible light or infrared light, and more particularly, to a photodetector circuit having low current consumption compared with a conventional one.

2. Description of the Related Art

Recent electronic devices provided with a function unnecessary under low ambient light conditions, such as time striking in a wall clock, or a function necessary under low ambient light conditions, such as a backlight of a mobile phone, have detected ambient light conditions by means of a built-in photodetector circuit so that the above-mentioned function may be enabled only when needed, to thereby achieve low power consumption. However, due to the recent demand for still lower power consumption, there arises a need to reduce power consumption of the built-in photodetector circuit as well.

FIG. 5 illustrates a circuit for controlling whether or not to strike the time in a wall clock by means of a conventional photodetector circuit. As illustrated in FIG. 5, the circuit has the following configuration. A photodiode 120 has an N-type terminal connected to a positive power supply terminal VDD, and a P-type terminal connected to a first electrode of a current limiting resistor 501. A transistor 510 has a collector and a base which are connected to a second electrode of the current limiting resistor 501 and a base of a transistor 511. The transistor 510 has an emitter connected to a reference power supply terminal GND. The transistor 511 has a collector connected to a first judgment node N1, and an emitter connected to the reference power supply terminal GND. A transistor 520 has a collector connected to the first judgment node N1, and a base connected to a collector of a transistor 521 and a first electrode of a reference resistor 502 together with a base of the transistor 521. The transistor 520 has an emitter connected to a second electrode of a switch 530 and an emitter of the transistor 521. The switch 530 has a first electrode connected to the positive power supply terminal VDD. The reference resistor 502 has a second electrode connected to the reference power supply terminal GND. A P-channel metal oxide semiconductor (MOS) transistor 104 has a source connected to the positive power supply terminal VDD, a gate connected to the first judgment node N1, and a drain connected to an output node N2. An N-channel MOS transistor 107 has a source connected to the reference power supply terminal GND, a gate connected to the first judgment node N1, and a drain connected to the output node N2. The output node N2 is connected to a clock control unit 540. Although not illustrated, the positive power supply terminal VDD is supplied with a positive voltage from a power source, while the reference power supply terminal GND is supplied with a zero-volt voltage from the power source.

The conventional photodetector circuit is configured as described above, and operates as follows to detect light while the switch 530 is turned ON.

The photodiode 120 generates a photocurrent that is proportional to brightness, and the photocurrent is mirrored into the transistor 511 via the transistor 510. A reference current flowing through the reference resistor 502 is mirrored into the transistor 520 via the transistor 521. Accordingly, the current flowing through the transistor 511 based on the photocurrent is compared at the first judgment node N1 with the current flowing through the transistor 520 based on the reference current. Under high ambient light conditions, the current flowing through the transistor 511 based on the photocurrent is larger in amount than the current flowing through the transistor 520 based on the reference current. Therefore, the first judgment node N1 is Low while the output node N2 is High, and hence the clock control unit 540 enables a time striking function in response to the signal of High. On the other hand, under low ambient light conditions, the current flowing through the transistor 511 based on the photocurrent is smaller in amount than the current flowing through the transistor 520 based on the reference current. Therefore, the first judgment node N1 is High while the output node N2 is Low, and hence the clock control unit 540 disables the time striking function in response to the signal of Low (see, for example, JP 2006-287658 A).

In the conventional photodetector circuit, the switch 530 is turned ON for a minimum time period when a photodetection operation needs to be performed, to thereby achieve low current consumption. However, a pulse circuit needs to be provided to perform intermittent control on the switch 530, which leads to a problem of an increased circuit scale. In addition, because a consumption current of the pulse circuit flows all the time, there is another problem that the consumption current of the pulse circuit cannot be reduced. Further, in the conventional photodetector circuit, the photocurrent of the photodiode 120 is not cut off by the switch 530, which leads to still another problem that the photocurrent is consumed all the time under high ambient light conditions.

SUMMARY OF THE INVENTION

The present invention has been made in view of the problems described above, and has an object of providing a photodetector circuit which consumes little current during standby, without the need to increase its circuit scale. The present invention further provides a photodetector circuit which consumes no photocurrent of a photodiode even under high ambient light conditions. In other words, the present invention provides a photodetector circuit having significantly low current consumption with a small circuit scale.

In order to solve the problems described above, a photodetector circuit according to the present invention is configured as follows. That is, the photodetector circuit includes: a first P-channel metal oxide semiconductor (MOS) transistor for charging a first node with an ON-state current of the first P-channel MOS transistor; a second P-channel MOS transistor for charging a second node with an ON-state current of the second P-channel MOS transistor; a first N-channel MOS transistor for discharging the first node with an ON-state current of the first N-channel MOS transistor, the first N-channel MOS transistor including a gate to which a voltage generated by generated power of a photoelectric element is input; and a depletion type N-channel MOS transistor for discharging the second node with an ON-state current of the depletion type N-channel MOS transistor, the depletion type N-channel MOS transistor including: a gate to which a voltage of a reference power supply terminal is input; and a source to which the voltage generated by the generated power of the photoelectric element is input, in which, when the voltage generated by the generated power of the photoelectric element is high, the first N-channel MOS transistor is turned ON, the depletion type N-channel MOS transistor is turned OFF, the first P-channel MOS transistor is turned OFF, and the second P-channel MOS transistor is turned ON, and when the voltage generated by the generated power of the photoelectric element is low, the first N-channel MOS transistor is turned OFF, the depletion type N-channel MOS transistor is turned ON, the first P-channel MOS transistor is turned ON, and the second P-channel MOS transistor is turned OFF.

The photodetector circuit according to the present invention is configured so that, regardless of ambient light conditions, a path in which a current flows may be cut off by any one of the MOS transistors, to thereby achieve significantly low current consumption with a simple circuit configuration.

DETAILED DESCRIPTION OF THE PREFERRED EMBODIMENTS

Figure 1:
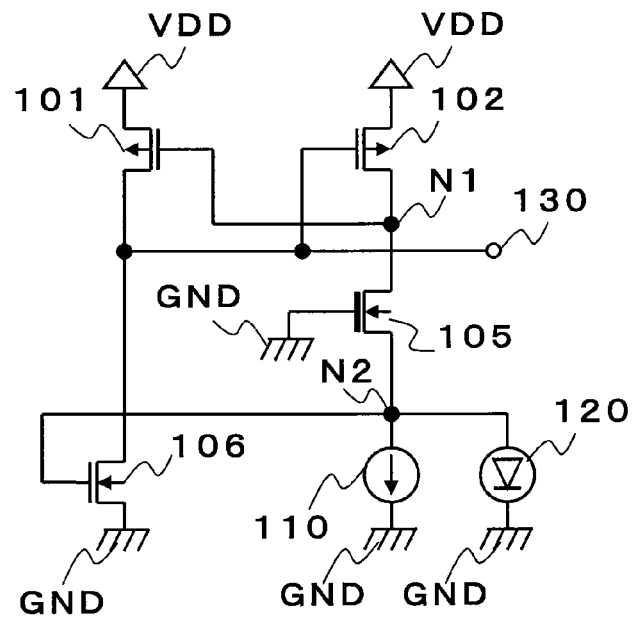
FIG. 1 is a schematic circuit diagram illustrating a photodetector circuit according to a first embodiment of the present invention.

Now, referring to the accompanying drawings, embodiments of the present invention are described below.
First Embodiment FIG. 1 is a schematic circuit diagram illustrating a photodetector circuit according to a first embodiment of the present invention. A P-channel metal oxide semiconductor (MOS) transistor 101 has a source connected to a positive power supply terminal VDD, a gate connected to a first node N1, and a drain connected to an output terminal 130. An N-channel MOS transistor 106 has a source connected to a reference power supply terminal GND, a gate connected to a second node N2, and a drain connected to the output terminal 130. A P-channel MOS transistor 102 has a source connected to the positive power supply terminal VDD, a gate connected to the output terminal 130, and a drain connected to the first node N1. A depletion type N-channel MOS transistor 105 has a source connected to the second node N2, a gate connected to the reference power supply terminal GND, and a drain connected to the first node N1. A constant current circuit 110 has an inflow terminal connected to the second node N2, and an outflow terminal connected to the reference power supply terminal GND. A PN junction element 120 has a P-type terminal connected to the second node N2, and an N-type terminal connected to the reference power supply terminal GND. Although not illustrated, the positive power supply terminal VDD is supplied with a positive voltage from a power source, while the reference power supply terminal GND is supplied with a zero-volt voltage from the power source.

The photodetector circuit according to the first embodiment is configured as described above, and operates as follows to detect light.

If light enters the PN junction element 120, power is generated in the PN junction element 120 to increase a voltage of the second node N2. The constant current circuit 110 discharges a constant current from the second node N2 to decrease the voltage of the second node N2.

When ambient light conditions are high and an amount of light entering the PN junction element 120 is equal to or more than a light amount to be detected, the voltage of the second node N2 increases due to the generated power of the PN junction element 120. When the voltage of the second node N2 increases, the N-channel MOS transistor 106 is turned ON while the depletion type N-channel MOS transistor 105 is turned OFF. Accordingly, the output terminal 130 is discharged to around a voltage of the reference power supply terminal GND with an ON-state current of the N-channel MOS transistor 106. Then, because the output terminal 130 is discharged to around the voltage of the reference power supply terminal GND, the P-channel MOS transistor 102 is turned ON so that the first node N1 may be charged to around a voltage of the positive power supply terminal VDD with an ON-state current of the P-channel MOS transistor 102. Then, because the first node N1 is charged to around the voltage of the positive power supply terminal VDD, the P-channel MOS transistor 101 is turned OFF.

On the other hand, when ambient light conditions are low and the amount of light entering the PN junction element 120 is less than the light amount to be detected, the generated power of the PN junction element 120 is so small that the voltage of the second node N2 may decrease due to the constant current discharge made by the constant current circuit 110. When the voltage of the second node N2 decreases, the N-channel MOS transistor 106 is turned OFF while the depletion type N-channel MOS transistor 105 is turned ON. Accordingly, the first node N1 is discharged to around the voltage of the reference power supply terminal GND with an ON-state current of the depletion type N-channel MOS transistor 105. Then, when the first node N1 is discharged to around the voltage of the reference power supply terminal GND, the P-channel MOS transistor 101 is turned ON so that the output terminal 130 may be charged to around the voltage of the positive power supply terminal VDD with an ON-state current of the P-channel MOS transistor 101. Then, because the output terminal 130 is charged to around the voltage of the positive power supply terminal VDD, the P-channel MOS transistor 102 is turned OFF. Therefore, the photodetector circuit according to the present invention has a function of outputting a detection signal to the output terminal 130 in accordance with ambient light conditions.

As described above, in the photodetector circuit according to the first embodiment, the depletion type N-channel MOS transistor 105 and the P-channel MOS transistor 101 are turned OFF under high ambient light conditions, while the N-channel MOS transistor 106 and the P-channel MOS transistor 102 are turned OFF under low ambient light conditions. Therefore, regardless of ambient light conditions, a path in which a current flows is interrupted all the time. In other words, the photodetector circuit according to the first embodiment has significantly low current consumption, regardless of ambient light conditions. As a result, an intermittent operation for achieving low current consumption is not required, resulting in a reduced circuit scale. Besides, a current consumed in a circuit for the intermittent operation and a photocurrent flowing through a PN junction element, such as a phototransistor, may be reduced as well.

Second Embodiment

Figure 2:
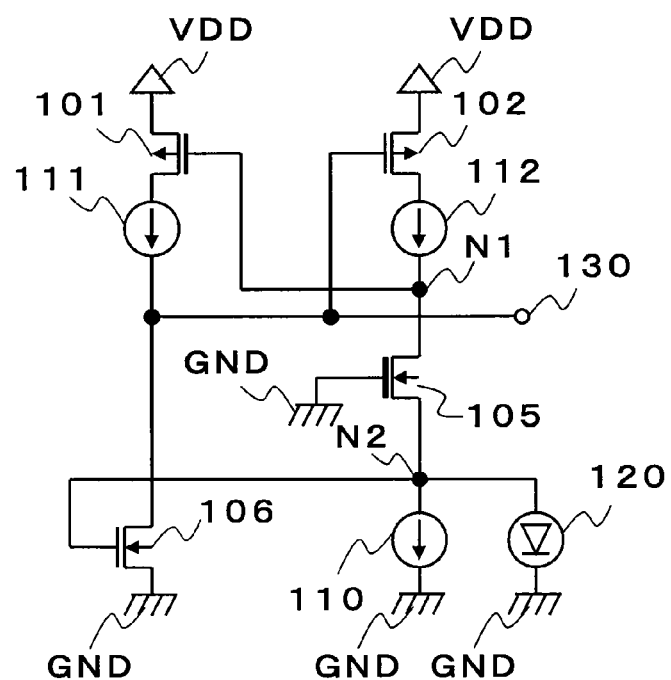
FIG. 2 is a schematic circuit diagram illustrating a photodetector circuit according to a second embodiment of the present invention.

FIG. 2 is a schematic circuit diagram illustrating a photodetector circuit according to a second embodiment of the present invention.

The photodetector circuit according to the second embodiment has a configuration realized by adding a constant current circuit 111 and a constant current circuit 112 in the configuration of the photodetector circuit according to the first embodiment. The constant current circuit 111 has an inflow terminal connected to the drain of the P-channel MOS transistor 101, and an outflow terminal connected to the output terminal 130. The constant current circuit 112 has an inflow terminal connected to the drain of the P-channel MOS transistor 102, and an outflow terminal connected to the first node N1. The constant current circuit 112 is configured such that a value of a constant current flowing therethrough is smaller than a value of the constant current flowing through the constant current circuit 110.

The photodetector circuit according to the second embodiment is configured as described above, and operates similarly to the photodetector circuit according to the first embodiment. A difference therebetween resides in that the ON-state current of the P-channel MOS transistor 101 is supplied to the output terminal 130 via the constant current circuit 111, and the ON-state current of the P-channel MOS transistor 102 is supplied to the first node N1 via the constant current circuit 112. Therefore, description is given only of effects of the constant current circuit 111 and the constant current circuit 112.

The photodetector circuit according to the present invention detects light by utilizing the change in voltage of the second node N2, which is caused in accordance with ambient light conditions. Depending on the magnitude of the voltage of the second node N2, the path in which the current flows cannot be completely interrupted to allow a through current to flow. The photodetector circuit according to the second embodiment has an object of further reducing the current consumption by reducing a current value of the through current.

In order to achieve the above-mentioned object, the ON-state currents of the P-channel MOS transistor 101 and the P-channel MOS transistor 102 need to be reduced. However, if the power supply voltage is high, a gate-source voltage of the transistor becomes significantly high, and hence an L-length thereof needs to be increased significantly. In other words, the P-channel MOS transistor 101 and the P-channel MOS transistor 102 each need to have a significantly large area. In view of this, the configuration is employed in which the constant current circuit 111 and the constant current circuit 112 are provided to limit the respective ON-state currents of the transistors. With this configuration, the respective ON-state currents may be reduced without the need to increase the areas of the P-channel MOS transistor 101 and the P-channel MOS transistor 102. In other words, according to the photodetector circuit of the second embodiment, by merely adding the two constant current circuits, the current value of the through current may be reduced to thereby further reduce the current consumption.

Third Embodiment

Figure 3:
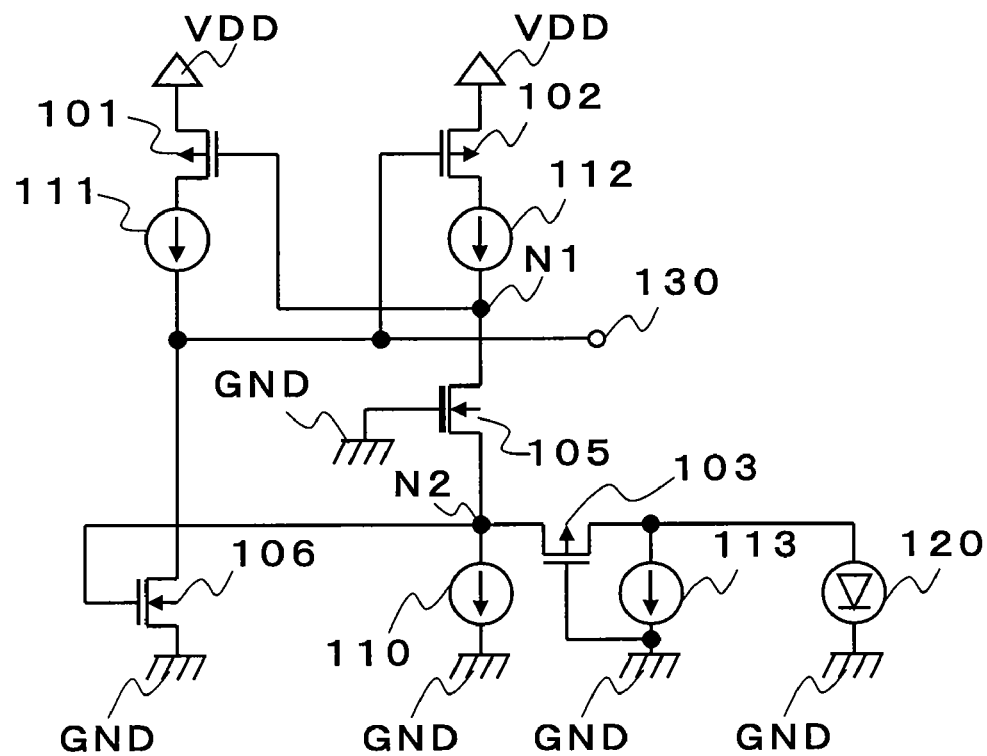
FIG. 3 is a schematic circuit diagram illustrating a photodetector circuit according to a third embodiment of the present invention.

FIG. 3 is a schematic circuit diagram illustrating a photodetector circuit according to a third embodiment of the present invention. The photodetector circuit according to the third embodiment has a configuration realized by adding a constant current circuit 113 and a P-channel MOS transistor 103 in the configuration of the photodetector circuit according to the second embodiment. The constant current circuit 113 has an inflow terminal connected to the P-type terminal of the PN junction element 120, and an outflow terminal connected to the reference power supply terminal GND. The P-channel MOS transistor 103 has a source connected to the P-type terminal of the PN junction element 120 and the inflow terminal of the constant current circuit 113, a gate connected to the reference power supply terminal GND, and a drain connected to the second node N2.

The photodetector circuit according to the third embodiment is configured as described above, and operates similarly to the photodetector circuit according to the second embodiment. Therefore, description is given only of operations and effects of the added constant current circuit 113 and the added P-channel MOS transistor 103.

The photodetector circuit according to the third embodiment has an object of further reducing the current consumption by further reducing a time period when the through current flows.

In order to achieve the above-mentioned object, a gate voltage of the N-channel MOS transistor 106, that is, the voltage of the second node N2 needs to be prevented from becoming such a voltage as to weakly turn ON the N-channel MOS transistor 106.

To the second node N2, the P-channel MOS transistor 103 supplies the remaining power, which is determined by subtracting power discharged by the constant current circuit 113 from the generated power of the PN junction element 120. When a source voltage of the P-channel MOS transistor 103 exceeds an absolute value of its threshold, the P-channel MOS transistor 103 supplies the voltage to the second node N2. Therefore, if design is made such that the absolute value of the threshold of the P-channel MOS transistor 103 may be larger than such a voltage as to weakly turn ON the N-channel MOS transistor 106, the time period when the through current flows may be reduced.

Meanwhile, if the photodetector circuit according to the second embodiment employs the PN junction element 120 of such a type that its generated voltage increases in proportion to an amount of light, a time period when the second node N2 has an indefinite voltage level is increased to increase an amount of the through current. Even in such a case, according to the photodetector circuit of the third embodiment, the time period when the voltage of the second node N2 has an indefinite level may be reduced to reduce the current consumption.

Figure 4:
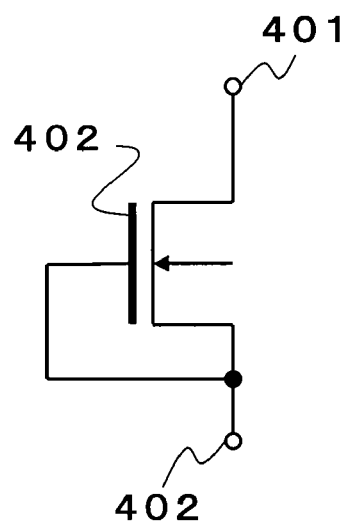
FIG. 4 is a circuit diagram illustrating an example of a constant current circuit used in the photodetector circuit according to the present invention.
Figure 5:
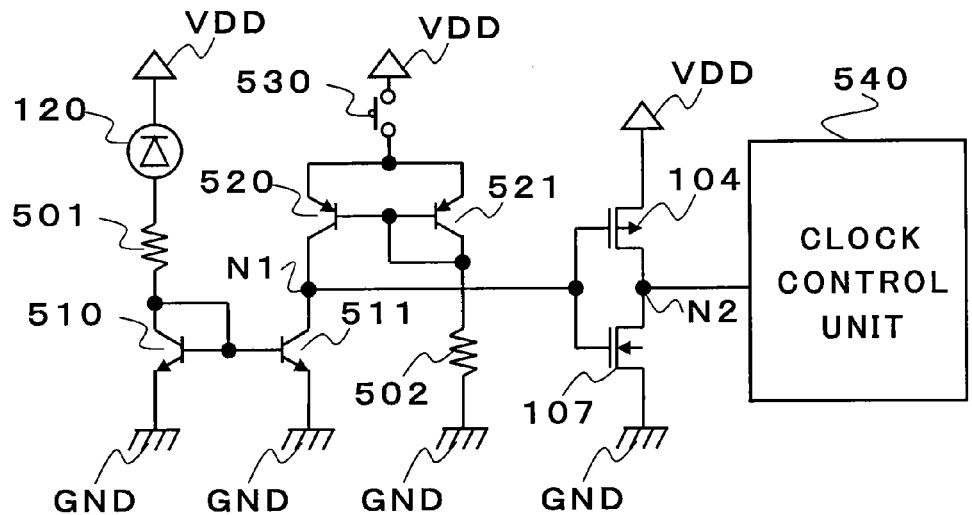
FIG. 5 is a schematic circuit diagram illustrating a case of controlling whether or not to strike the time in a wall clock by means of a conventional photodetector circuit.

FIG. 4 is a circuit diagram of a constant current circuit used in the photodetector circuit according to the present invention. The constant current circuit illustrated in FIG. 4 includes a depletion type N-channel MOS transistor 402. The depletion type N-channel MOS transistor 402 has a drain connected to an inflow terminal 401 of the constant current circuit, and a source and a gate which are connected to an outflow terminal 402 thereof.

With the configuration described above, a circuit scale of the constant current circuit may be reduced. Further, a current path exists only between the drain and the source of the depletion type N-channel MOS transistor 402, and hence by merely interrupting the current path, current consumption may be reduced to zero. Therefore, the constant current circuit configured as described above is the most suitable for the photodetector circuit according to the present invention.

Note that the circuit configuration is made such that the gate of one of the P-channel MOS transistors 101 and 102 is connected to a node which is charged by the other of those opposing P-channel MOS transistors. However, the present invention is not limited to the above-mentioned circuit configuration as long as the circuit configuration is capable of the same control.

Further, according to the present invention, the gate of the N-channel MOS transistor 106 and the source of the depletion type N-channel MOS transistor 105 are connected to the same node, but may be connected to different nodes, as long as the node has a voltage which increases in accordance with the generated power of the PN junction element. Still further, a plurality of the PN junction elements may be provided.

Still further, the present invention may employ a configuration in which, when light is detected, an amount of the current of each of the constant current circuits 110 and 113 is reduced in response to a detection signal of the detection of light so that hysteresis may be provided to a light amount of light to be detected.

Still further, the PN junction element 120 is not limited to a PN junction element as long as the PN junction element 120 is a photoelectric element capable of generating power when receiving light, such as a dye-sensitized photoelectric element.

Figure 6:
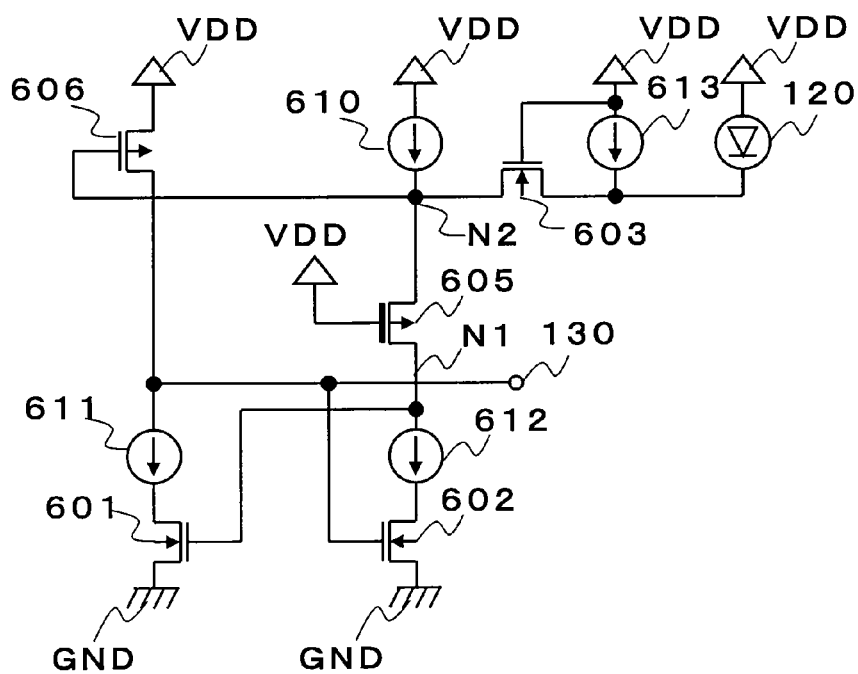
FIG. 6 is a schematic circuit diagram of a photodetector circuit having a configuration in which channel types of MOS transistors used in the third embodiment of the present invention are reversed.

FIG. 6 is a schematic circuit diagram of a photodetector circuit having a configuration in which channel types of the MOS transistors are reversed. The circuit is accomplished by reversing the channel types of the MOS transistors in the configuration according to the third embodiment illustrated in FIG. 3. In other words, the circuit is accomplished by replacing the P-channel MOS transistors with N-channel MOS transistors, the N-channel MOS transistor with a P-channel MOS transistor, and the depletion type N-channel MOS transistor with a depletion type P-channel MOS transistor, respectively.

Similarly, each node has a voltage reversed to that in the photodetector circuit of FIG. 3, and hence the output terminal 130 becomes High when supplied with the generated power of the PN junction element 120. The configuration described above also produces the same effects as in the photodetector circuit described in the third embodiment.

Note that each of constant current circuits 610 to 612 may have the configuration illustrated in FIG. 4 in which the gate and the source of the depletion type N-channel MOS transistor are connected to each other. Alternatively, although not illustrated, a configuration in which a gate and a source of a depletion type P-channel MOS transistor are connected to each other may be employed without any problems.

As described above, the photodetector circuit according to the present invention has significantly low current consumption, regardless of the presence/absence of light. Therefore, if the photodetector circuit is used as an activation circuit of an electronic device, power consumption of the electronic device may be substantially eliminated during standby.

For example, the photodetector circuit according to the present invention may be applied to an automatic flush toilet. A configuration is made such that, when light entering the photodetector circuit of the present invention is blocked by a hand, the toilet may be flushed for a fixed time period. With this configuration, current consumption of the automatic flush toilet may be reduced to substantially zero during standby.

However, in this case, discrimination cannot be made between a case where a bathroom is dark and the case where light is blocked by a hand. In view of this, by adding another photodetector circuit for detecting only ambient light conditions, the discrimination may be made between the case where the bathroom is dark and the case where light is blocked by a hand.

In this case, if two photoelectric elements are configured as follows, stable detection may be performed, regardless of light conditions. A configuration is made such that generated power of one of the two photoelectric elements may be subtracted from generated power of the other thereof. For example, the two photoelectric elements are connected with polarities reversed to each other so that a photocurrent of the one of the two photoelectric elements may be subtracted from the generated power of the other thereof With this configuration, power is generated based on an intensity difference of light entering the two photoelectric elements, and is input to the second node N2. Then, a configuration is made such that only the light entering the other of the photoelectric elements, which corresponds to the subtrahend, is to be blocked by a hand. With this configuration, the discrimination may be made between the case where the bathroom is dark and the case where light is blocked by a hand, and further the stable detection may be performed, regardless of the amount of light blocked by a hand and light conditions in the bathroom.

Further, for example, the photodetector circuit according to the present invention may be applied to an electronic device, such as a television set, whose power supply is turned on by means of a remote control. A configuration is made such that a receiver of the remote control may be switched on when the photodetector circuit of the present invention detects light. With this configuration, current consumption of such an electronic device may be reduced to substantially zero during standby. However, in this case, in order to prevent a malfunction in the photodetector circuit of the present invention, which may be caused by ambient light, the remote control needs to be configured so as to allow strong light or unusual pulsed light to enter the photodetector circuit, or alternatively, the photodetector circuit of the present invention needs to be configured so as to detect only light with a certain wavelength, such as infrared rays, and the remote control needs to allow the light with the wavelength detectable by the photodetector circuit of the present invention to enter the photodetector circuit.

What is claimed is:

1. A photodetector circuit for detecting an amount of incident light, comprising:
    a photoelectric element which generates more power as the amount of incident light increases, the photodetector circuit detecting the amount of incident light based on an amount of the generated power of the photoelectric element;
    a first P-channel metal oxide semiconductor (MOS) transistor for charging an output terminal with an ON-state current of the first P-channel MOS transistor;
    a second P-channel MOS transistor for charging a first node with an ON-state current of the second P-channel MOS transistor;
    a first N-channel MOS transistor for discharging the output terminal with an ON-state current of the first N-channel MOS transistor,
       the first N-channel MOS transistor including a gate to which a voltage generated by the generated power of the photoelectric element is input; and
    a first depletion type N-channel MOS transistor for discharging the first node with an ON-state current of the first depletion type N-channel MOS transistor,
       the first depletion type N-channel MOS transistor including:
          a gate to which a voltage of a reference power supply terminal is input; and
          a source to which the voltage generated by the generated power of the photoelectric element is input, wherein, when the voltage generated by the generated power of the photoelectric element is high, the first N-channel MOS transistor is turned ON, the first depletion type N-channel MOS transistor is turned OFF, the first P-channel MOS transistor is turned OFF, and the second P-channel MOS transistor is turned ON, and wherein, when the voltage generated by the generated power of the photoelectric element is low, the first N-channel MOS transistor is turned OFF, the first depletion type N-channel MOS transistor is turned ON, the first P-channel MOS transistor is turned ON, and the second P-channel MOS transistor is turned OFF.

2. A photodetector circuit according to claim 1, further comprising:
   a first constant current circuit; and
   a second constant current circuit having a value of a constant current flowing therethrough larger than a value of a constant current flowing through the first constant current circuit,
   wherein the ON-state current of the second P-channel MOS transistor charges the first node via the first constant current circuit, and
   wherein the first depletion type N-channel MOS transistor allows a source current to flow into the reference power supply terminal via the second constant current circuit.

3. A photodetector circuit according to claim 2, further comprising a third constant current circuit,
   wherein the ON-state current of the first P-channel MOS transistor charges the output terminal via the third constant current circuit.

4. A photodetector circuit according to claim 1, further comprising a third P-channel MOS transistor including a gate to which the voltage of the reference power supply terminal is input,
   wherein the generated power of the photoelectric element is supplied to the gate of the first N-channel MOS transistor via the third P-channel MOS transistor.

5. An electronic device, comprising:
   the photodetector circuit according to claim 1; and
   a control unit to be activated in response to an output signal of the photodetector circuit.

6. A photodetector circuit for detecting an amount of incident light, comprising:
   a photoelectric element which generates more power as the amount of incident light increases, the photodetector circuit detecting the amount of incident light based on an amount of the generated power of the photoelectric element;
   a first N-channel MOS transistor for charging an output terminal with an ON-state current of the first N-channel MOS transistor;
   a second N-channel MOS transistor for charging a first node with an ON-state current of the second N-channel MOS transistor;
   a first P-channel MOS transistor for discharging the output terminal with an ON-state current of the first P-channel MOS transistor,
      the first P-channel MOS transistor including a gate to which a voltage generated by the generated power of the photoelectric element is input; and
   a first depletion type P-channel MOS transistor for discharging the first node with an ON-state current of the first depletion type P-channel MOS transistor,
      the first depletion type P-channel MOS transistor including:
         a gate to which a voltage of a positive power supply terminal is input; and
         a source to which the voltage generated by the generated power of the photoelectric element is input,
   wherein, when the voltage generated by the generated power of the photoelectric element is high, the first P-channel MOS transistor is turned ON, the first depletion type P-channel MOS transistor is turned OFF, the first N-channel MOS transistor is turned OFF, and the second N-channel MOS transistor is turned ON, and
   wherein, when the voltage generated by the generated power of the photoelectric element is low, the first P-channel MOS transistor is turned OFF, the first depletion type P-channel MOS transistor is turned ON, the first N-channel MOS transistor is turned ON, and the second N-channel MOS transistor is turned OFF.

7. An electronic device, comprising:
   the photodetector circuit according to claim 6; and
   a control unit to be activated in response to an output signal of the photodetector circuit.

\* \* \* \* \*